Aug. 2, 1932.    W. B. STOUT    1,869,871
AIRPLANE
Filed July 19, 1926    10 Sheets-Sheet 1
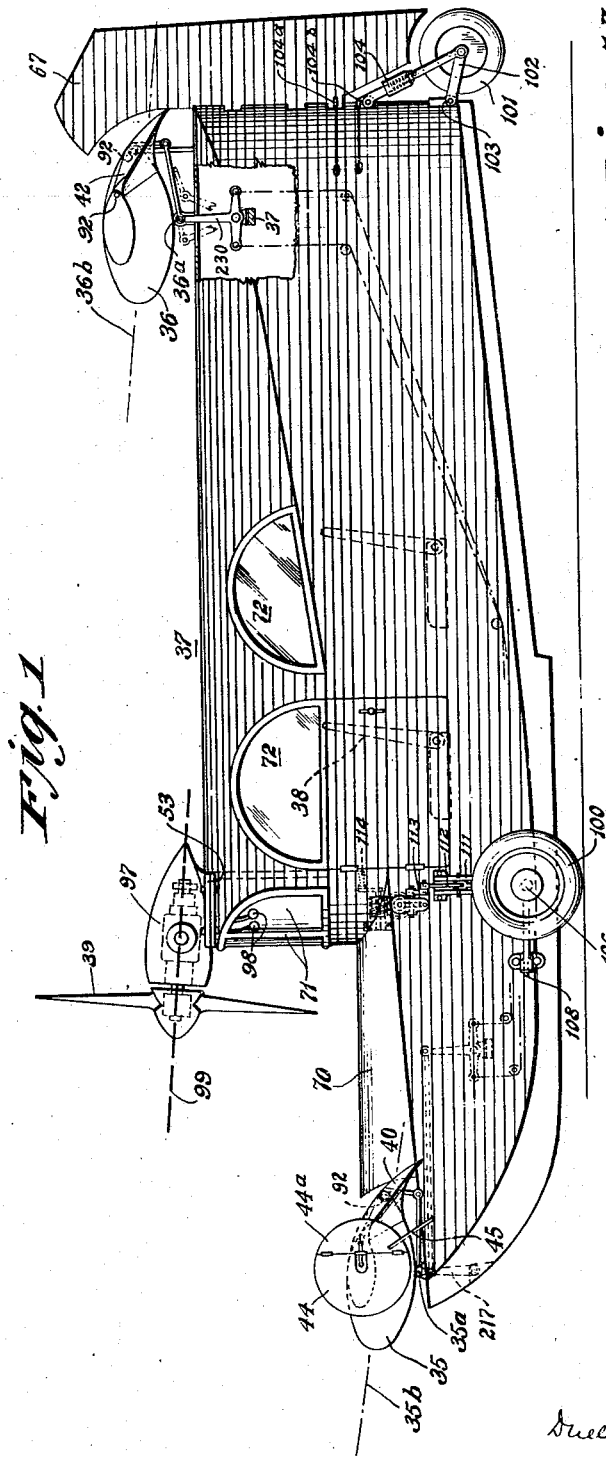
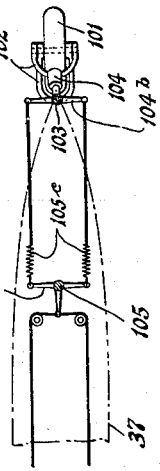
INVENTOR
William B. Stout
BY
Duell, Dunn & Anderson
ATTORNEY Aug. 2, 1932.    W. B. STOUT    1,869,871
AIRPLANE
Filed July 19, 1926    10 Sheets-Sheet 3
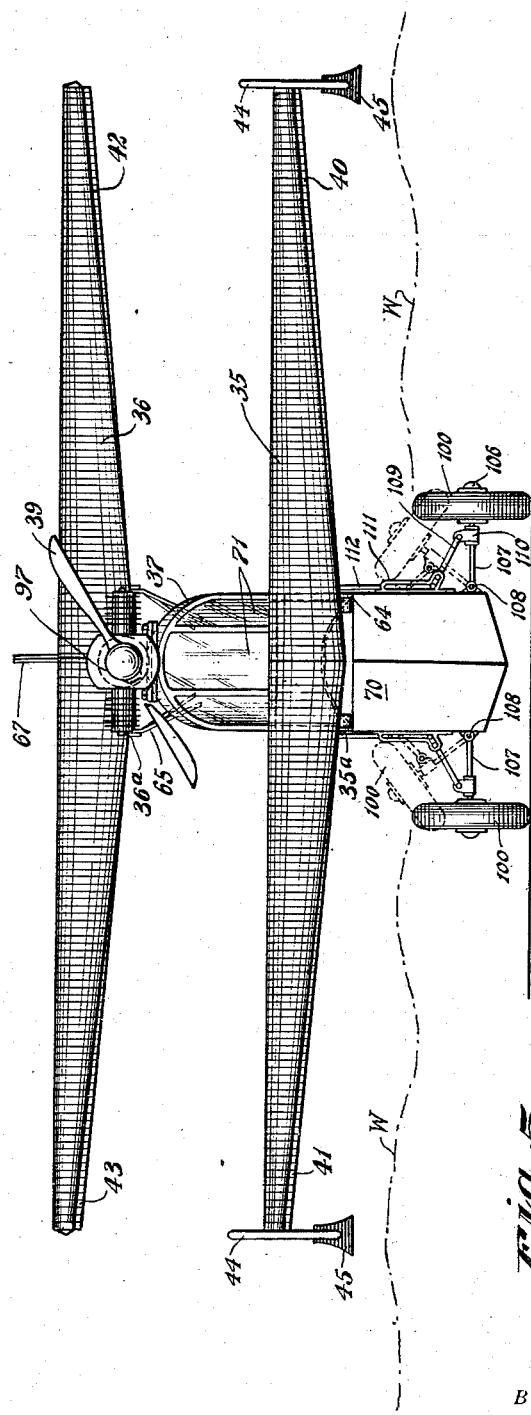
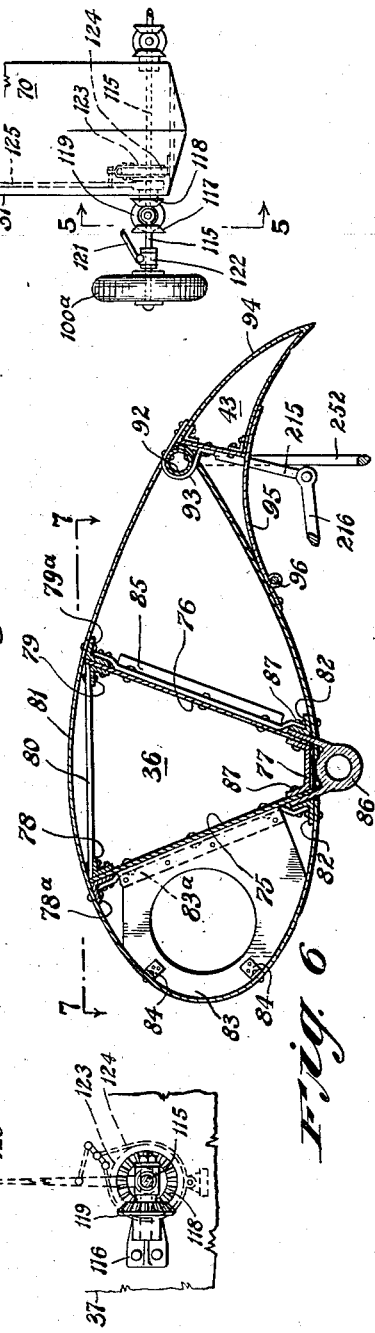
INVENTOR
William B. Stout
BY Duell, Dunn & Anderson
ATTORNEY

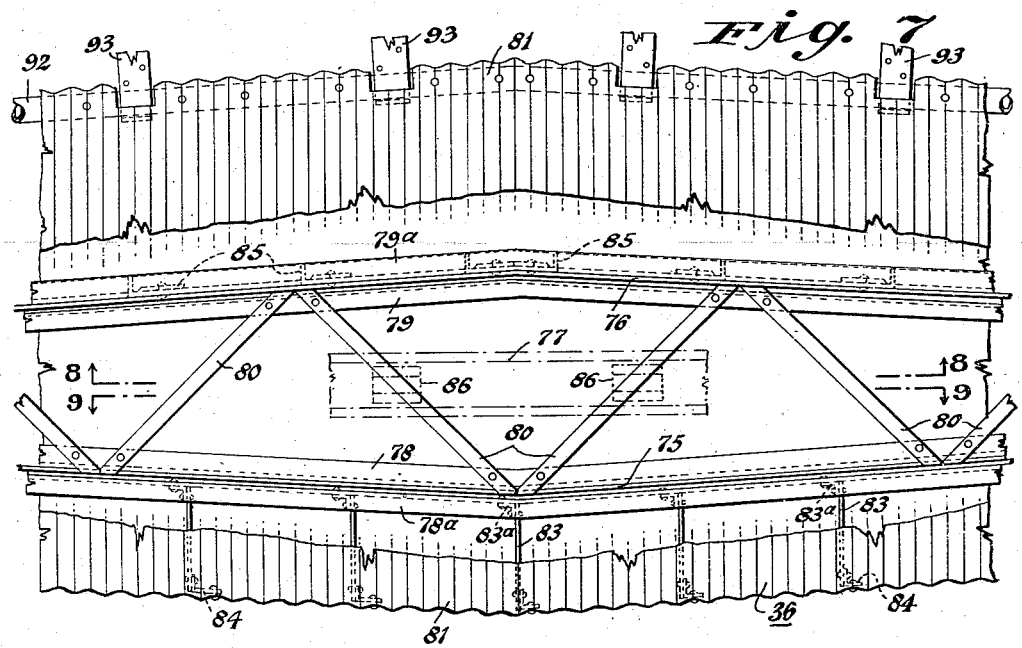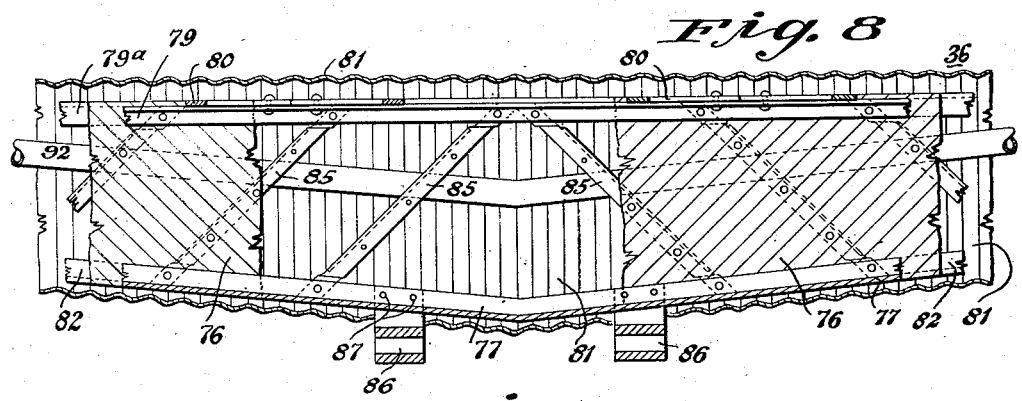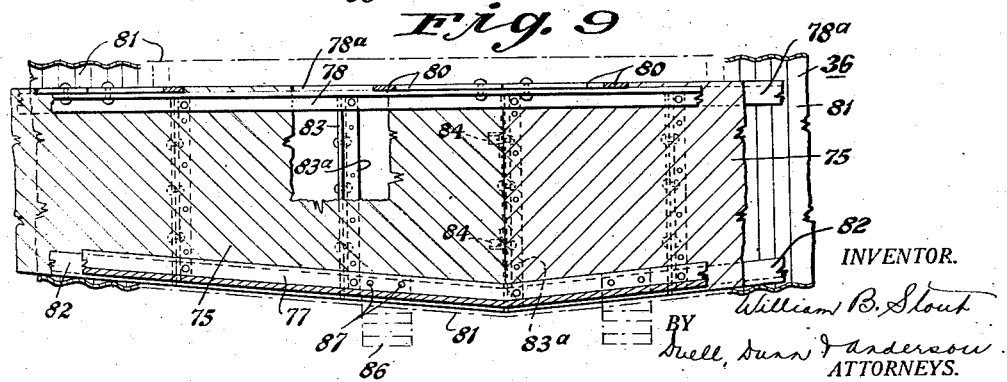

Aug. 2, 1932.  W. B. STOUT  1,869,871
AIRPLANE
Filed July 19, 1926  10 Sheets-Sheet 5
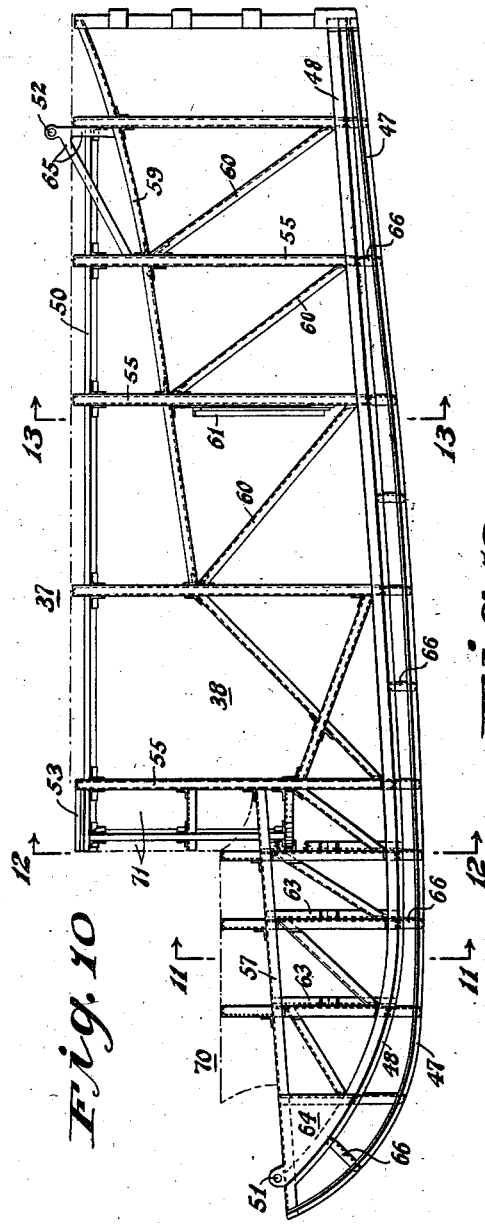
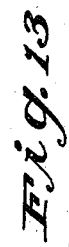
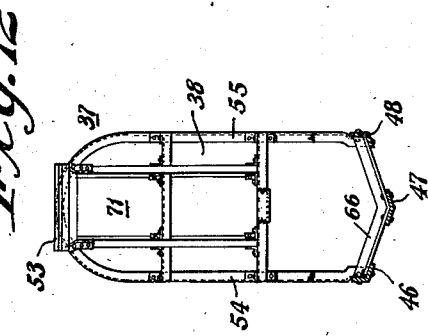
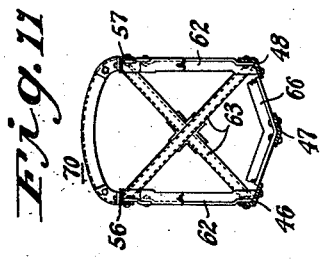
INVENTOR.
William B. Stout
BY Duell, Dunn & Anderson
ATTORNEYS.

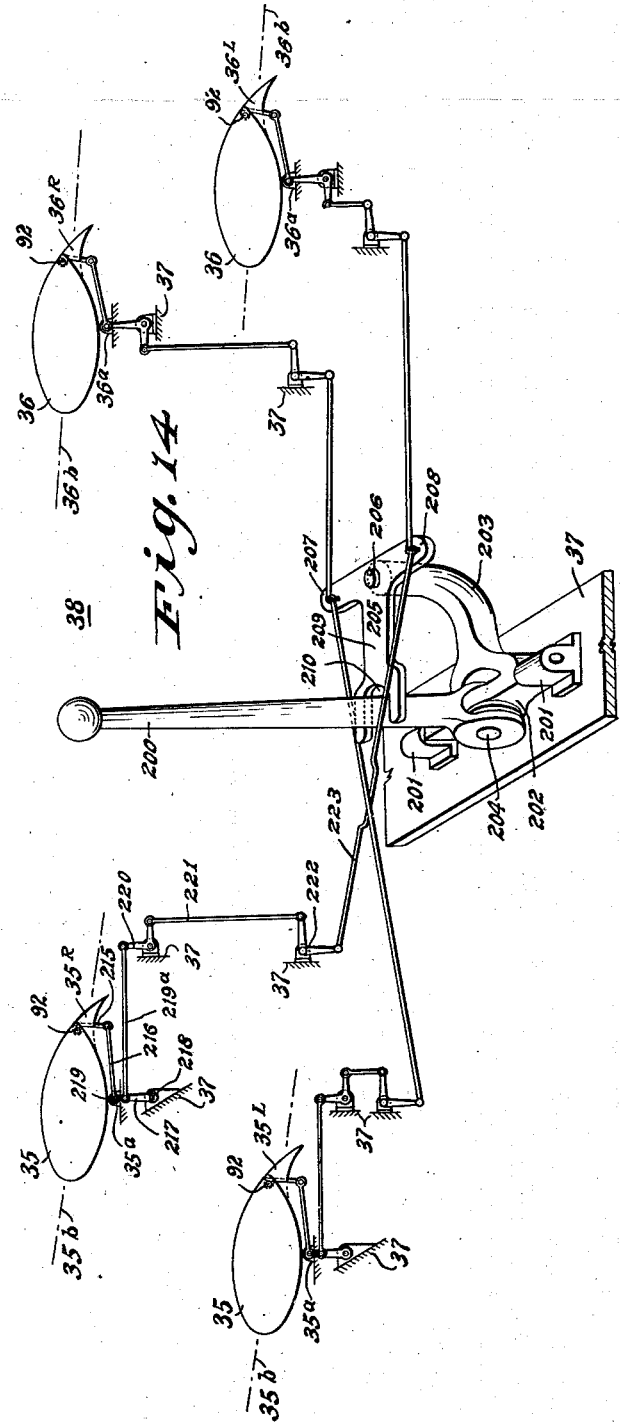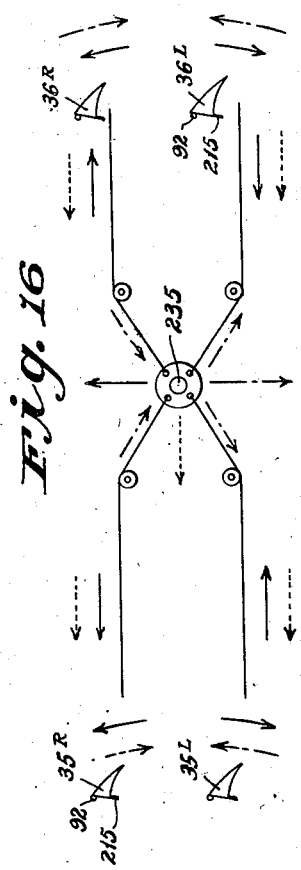

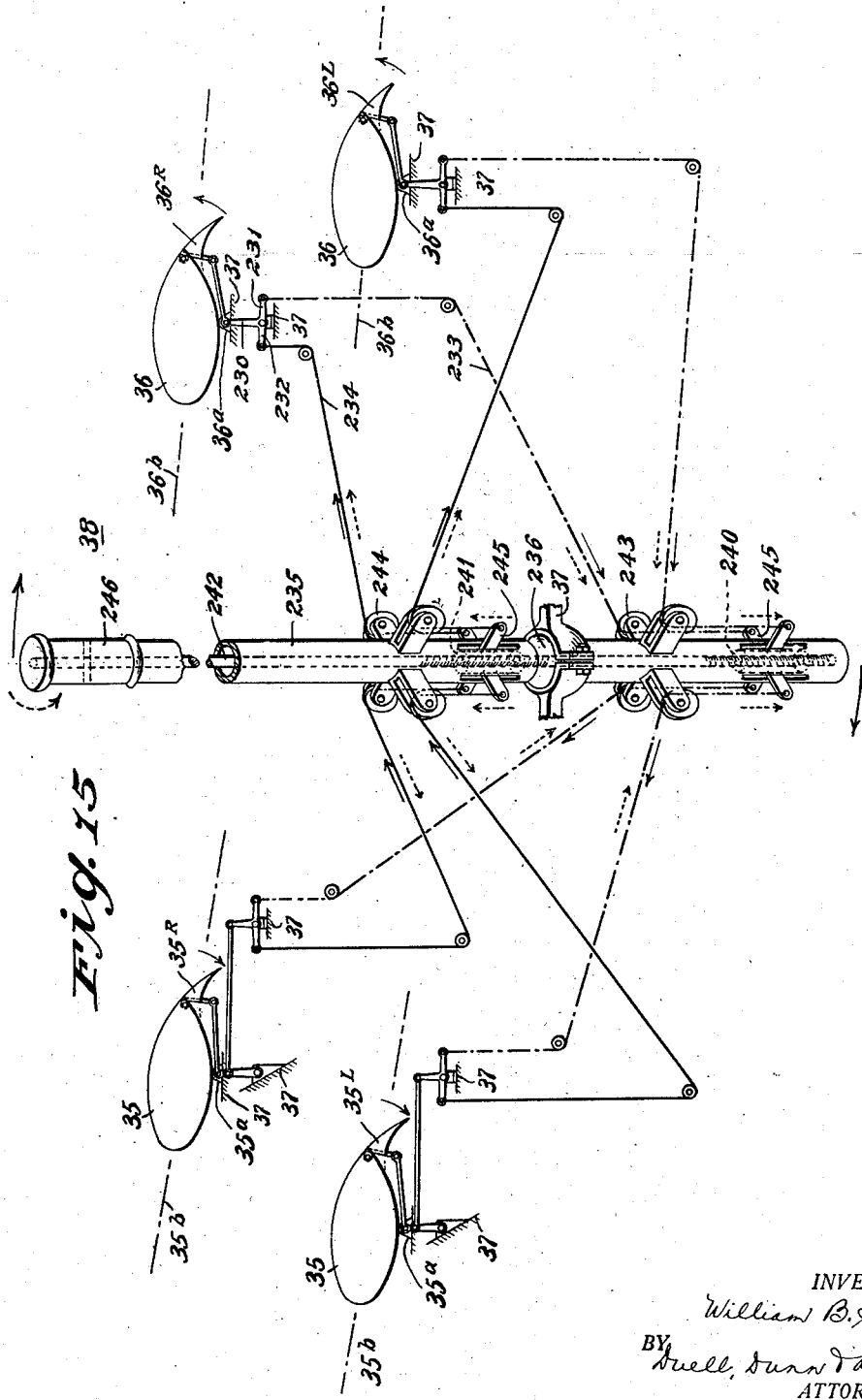

Aug. 2, 1932.  W. B. STOUT  1,869,871
AIRPLANE
Filed July 19, 1926   10 Sheets-Sheet 8
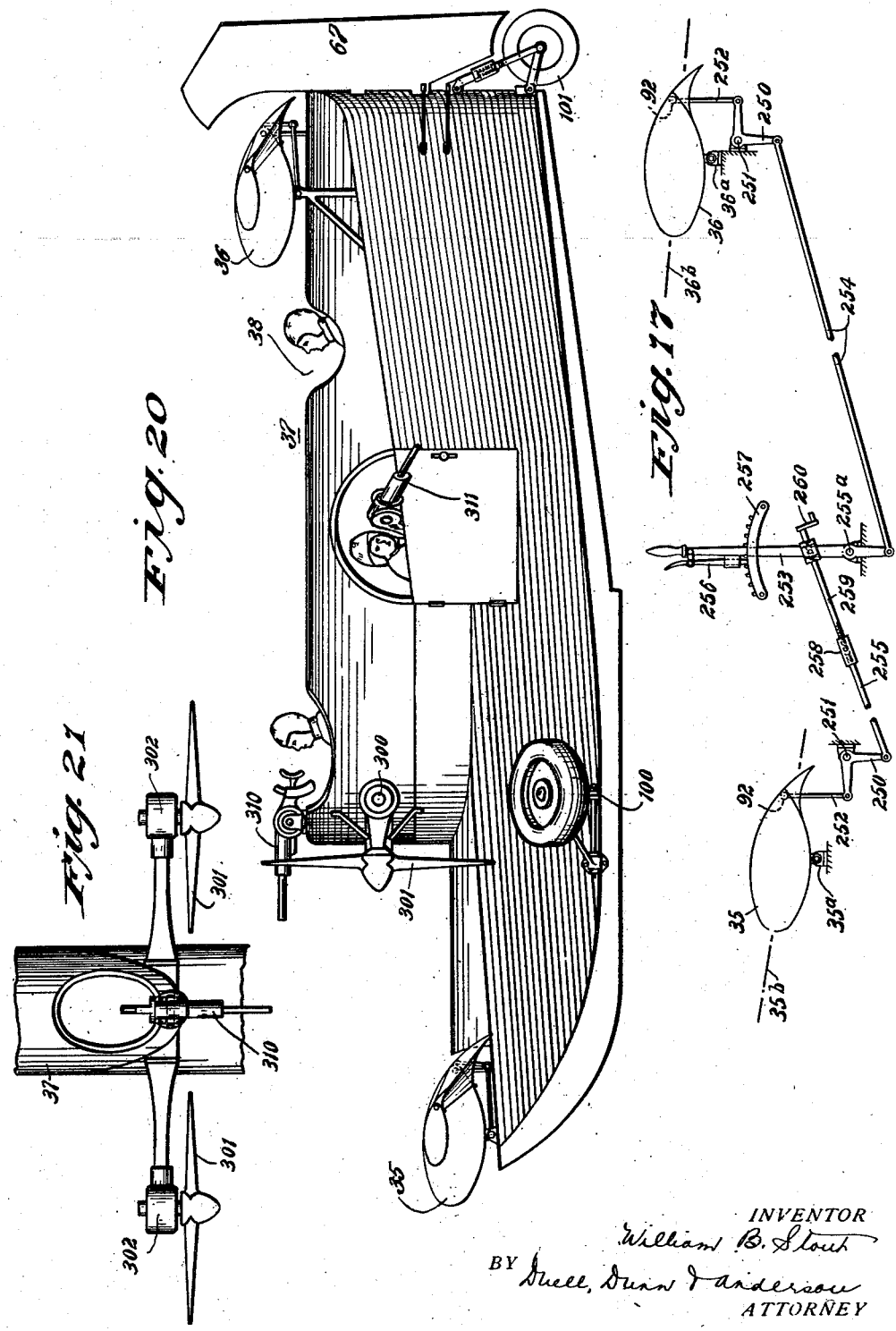
INVENTOR
William B. Stout
BY Duell, Dunn & Anderson
ATTORNEY Aug. 2, 1932.  W. B. STOUT  1,869,871
AIRPLANE
Filed July 19, 1926      10 Sheets-Sheet 9
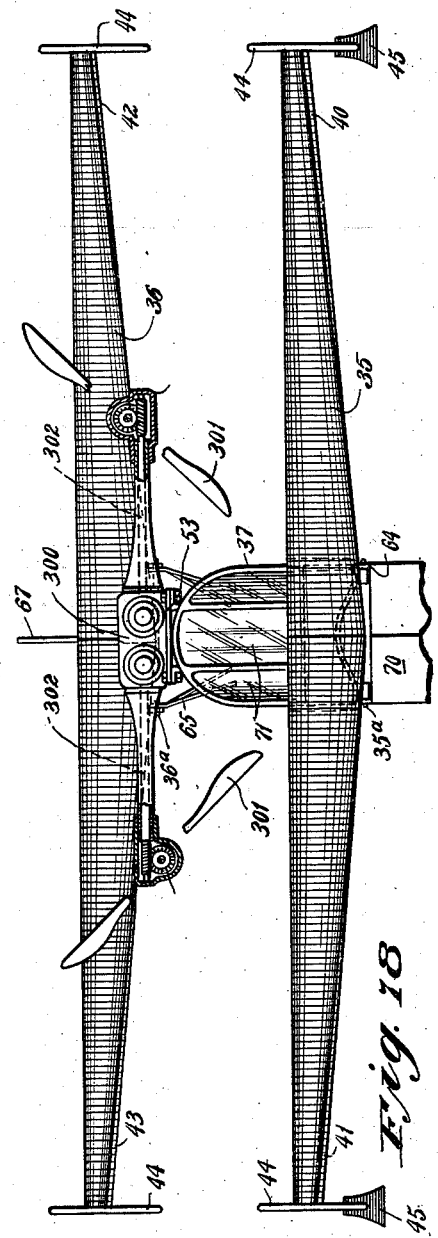
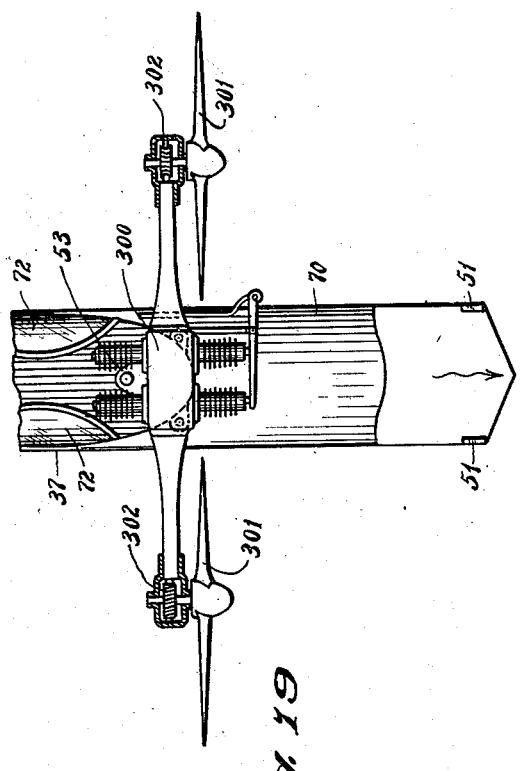
Fig. 18
Fig. 19
INVENTOR
William B. Stout
BY
Duell, Dunn & Anderson
ATTORNEY Aug. 2, 1932.   W. B. STOUT   1,869,871
AIRPLANE
Filed July 19, 1926   10 Sheets-Sheet 10
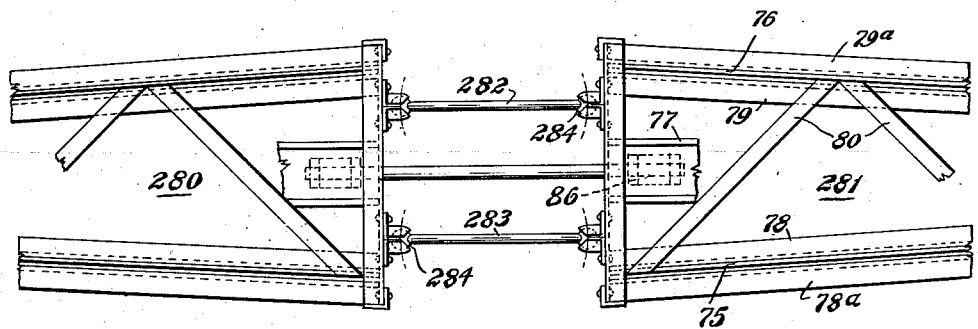
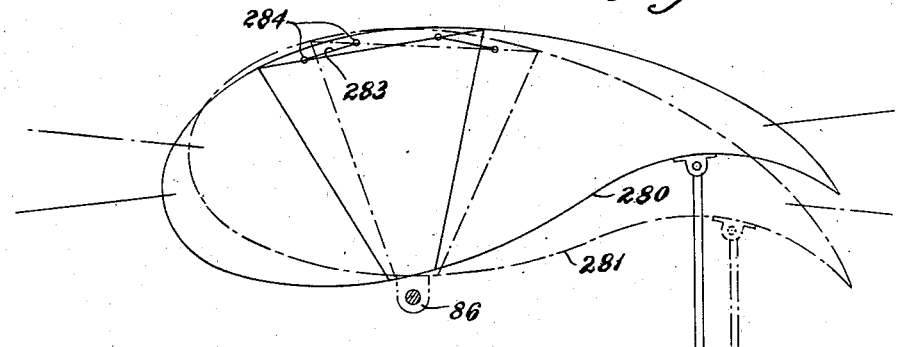
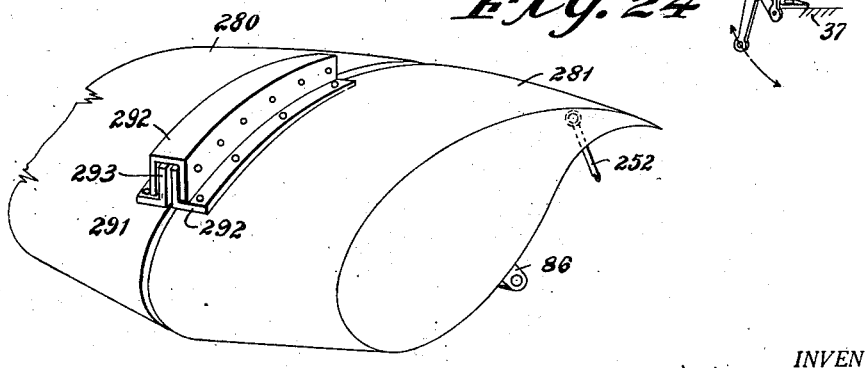
INVENTOR.
William B. Stout
BY Duell, Dunn & Anderson
ATTORNEYS.

Patented Aug. 2, 1932

1,869,871

UNITED STATES PATENT OFFICE

WILLIAM B. STOUT, OF DETROIT, MICHIGAN, ASSIGNOR TO FORD MOTOR COMPANY, OF HIGHLAND PARK, MICHIGAN

AIRPLANE

Application filed July 19, 1926. Serial No. 123,404.

This invention relates to airplanes.

Airplanes as previously proposed and actually flown, have represented a safety factor which has been probably 90% pilot and 10% ship. Aerial transportation cannot properly progress unless the human element becomes the minor safety factor. Therefore, the prime object of the invention is to provide an airplane wherein the safety factor is, so far as possible, inherent in the airplane—a so-called "fool proof" type.

An important object of the invention is to provide a novel type of airplane, and one which shall have a high degree of safety and dependability as the result of inherent aerodynamic and structural characteristics.

Another object is to provide an airplane, the aerodynamic surfaces of which are so shaped and related that natural longitudinal stability is present in such high degree that either a dangerous stall or nose-dive is virtually impossible.

Another object of the invention is to provide an airplane also having a natural lateral stability such that side-slip is virtually impossible and banking is semi-automatic.

Another object is to provide an airplane, so constructed as to insure safety not only in flight and in taking off, but in alighting, under all reasonable conditions.

Another object is to provide an airplane so constructed that lower feasible landing speeds and shorter landing fields than heretofore may be used; and also an airplane which, after a comparatively short float period, may be dropped to set its full weight on the ground, safely and without shock, practically at will.

Another object is to provide an airplane so constructed that landing may be on extremely rough ground virtually without any possibility of nosing over, or of a "ground loop" such as would injure the pilot, passengers, cargo or plane. In other words, the object is to provide an airplane which shall be virtually crash-proof on any landing, even on rough ground or ice, where wheels are ordinarily of no help.

Another object, nevertheless, is to provide an airplane having a landing gear such that the airplane may be moved and steered under its own power on land as a wheeled vehicle; yet at the same time to provide an airplane which shall be truly amphibian.

Another object is to provide an airplane so constructed that faster initial climb to the straight-away flight altitude may be obtained, yet with an expenditure of horsepower per pound weight no greater than in previous types.

An important object is to provide an airplane which, while having automatic or semi-automatic safety features, is easily and reliably controlled by the pilot.

Still another object, accordingly, is to provide an airplane as above, so constructed as to have great delicacy and responsiveness to manual controls, and yet great strength and rigidity throughout.

A further object is to provide an airplane of comparatively low cost of manufacture, maintenance and operation.

Various other objects will be in part obvious and in part pointed out in the course of the following description of a preferred form or embodiment of various features of the invention. While this form is shown as of the two passenger type, it will of course be understood that other types of airplane pursuant to the invention might be of great size and power, to carry many passengers and considerable cargo. Further, I desire it to be clearly understood that my invention and its various features may be embodied in various forms and constructions, and the description and drawings herein given are intended in an illustrative and not in a limited sense.

In the drawings,

Fig. 1 is a side elevation of an airplane embodying one form of the present invention.

Fig. 1a is a detail, somewhat diagrammatic showing the back wheel steering mechanism.

Fig. 3 shows the airplane in front elevation.

Fig. 4 is a fragmentary front elevation of a brake-operating mechanism.

Fig. 5 is a fragmentary section on the line 5—5 of Fig. 4.

Fig. 6 is a transverse or chordwise section through one of the wings, taken on the line 6—6 of Fig. 2.

Fig. 7 is a section taken on line 7—7 of Fig. 6.

Fig. 8 is a section taken on line 8—8 of Fig. 7.

Fig. 9 is a section taken on line 9—9 of Fig. 7.

Fig. 10 is a side elevation of the supporting framework for the fuselage body.

Fig. 11, 12, 13, are sections along the lines 11—11, 12—12, and 13—13, respectively, of Fig. 10.

Fig. 14 is a diagrammatic view showing one form of aileron control.

Fig. 15 is a modified form of aileron control.

Fig. 16 is a diagram illustrating the relation of the movement of the joy stick to the movement of the ailerons.

Fig. 17 is a diagrammatic view showing the climb stick operating mechanism.

Fig. 18 is a fragmentary front elevation of a modified form of airplane, carrying two propellers driven by a central power plant.

Fig. 19 is a fragmentary view in top plan showing the propellers and power plant.

Fig. 20 is a side elevation of another modification of the airplane.

Fig. 21 is a fragmentary view in top plan showing the propellers and power plant of the airplane of Fig. 20.

Fig. 22 is a plan view of a central portion of the supporting framework upon the wing of a modified type of the plane, in which the right and left halves of the wing are articulated to each other.

Fig. 23 shows an operating mechanism for the type of wing illustrated in Fig. 22.

Fig. 24 is a perspective view of an alternative method of articulating the halves of the wing.

Figure 2:
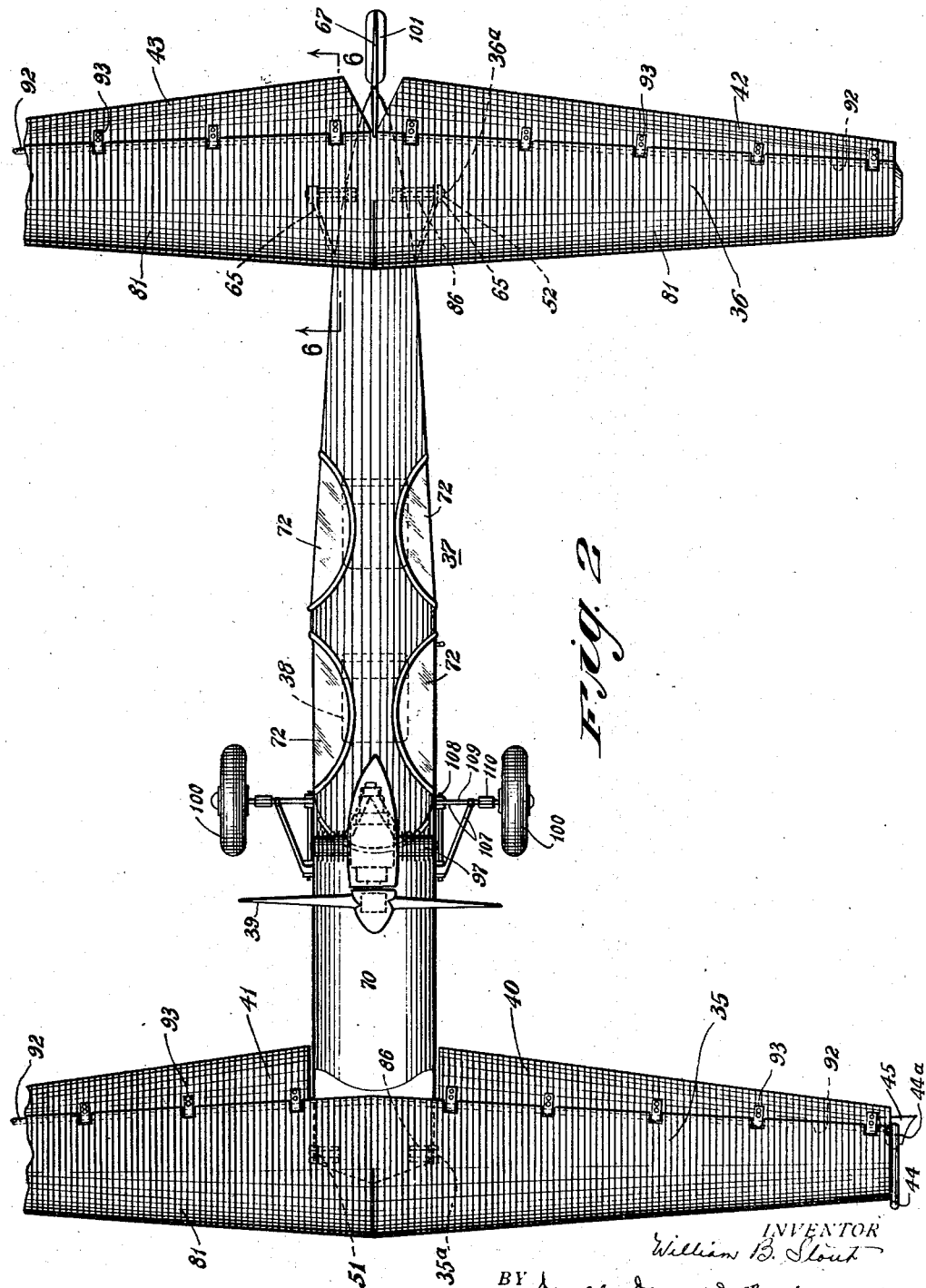
Fig. 2 is a top plan view of this airplane partially broken away near the wing tips on one side.

In the airplanes heretofore in use, it has been found that those wing shapes which are aero-dynamically and mechanically the most desirable, possess the disadvantage of a considerable shift in the center of pressure with change in the angle of incidence. When such a wing is employed in the customary type of airplane, a stabilizer is required on the empennage which offers a drag resistance, but cannot be depended upon to contribute proportionately to the lift, and actually, during ascent, opposes the lifting force.

Moreover, by reason of the fact that the stabilizer is of relatively small area, its stabilizing effect is not uniform at different speeds and at different angles of flight. By reason of these facts, and by reason of the fact that substantially the entire support is obtained from the wing airfoil, the center of gravity of the plane and the center of pressure of the airfoil are necessarily very close together so that a slight shift in the center of pressure produces a very pronounced effect upon the stability. This requires an extensive use of the elevator control which inherently makes the safety of the airplane dependent upon the human factor.

In accordance with the present invention it has been found that these difficulties may be overcome or much reduced by abandoning the theory of a supporting plane stabilized by a stabilizer at the empennage, and employing in the place thereof a pair of supporting members which are similar to each other and may be said to be arranged in tandem in that one is mounted near the rear of the fuselage, and one near the front. By this means, for a given wing area, the effective chord of the wing is lessened by approximately one-half, thus decreasing the possible center pressure movement for the same airfoil in equivalent ratio. Therefore, a shift in the angle of these planes has little comparative effect on stability.

*Wing construction*

The new airplane accordingly, as shown in the accompanying drawings, includes a wing equipment made up of plurality of wings in tandem relation, comprising a wing 35 and a wing 36 attached respectively near the forward and rear ends of a fuselage 37 having a pilot station at 38. The fuselage 37 is provided with mounting means for the propeller 39 and this propeller is preferably arranged out of the slip stream of both wings. Wings 35 and 36 which are of the fat type are shown as is preferred, of a very high aspect ratio especially in view of their low fineness ratio.

These wings also are shown, as is preferred, as raked positively at their leading edges and negatively at their trailing edges, to avoid tip loss due to eddies and outward deflection of the air-stream. Also the wings are shown as having a forward edge rake substantially one-half that of the trailing edge, so that on each wing the loci of all points substantially one-third of the way back from the leading edges, are on a straight transverse line, which is desirable.

I also prefer, as shown, to provide a doubly convex wing, that is, one convexly arched or cambered on top and bottom, and with the maximum depth of the wing one-third the way back along the chord, to have the wing shape itself limit the center of pressure shift at varying angles of flight as much as possible.

The wings 35 and 36 are pivoted on the body 37 as indicated at 35a and 36a, to provide very little, if any, appreciable wing center-of-pressure shift, at varying angles and to provide for substantially no center of pressure shift on the ship as a whole, on moving the wings on their pivots to change flying angles. Further, I am enabled to pivot the wings in the lines of their centers of lift or pressure at normal flight angles of attack. With the type of wing illustrated in which there is a slight shift rearwardly of the center of support as the angle of attack is lowered, the pivoting herein described, will utilize this slight shift to maintain the center of support directly over the pivot. The wings are thus pivoted at such points that the center of pressure shift imposes small strains on the wing structure, on the pivot supports and on body 37, and so that this shift also has a negligible effect on the controls. Accordingly, a change in the angle of attack of both wings simultaneously may be accomplished with slight effort on the part of the pilot and by the use of control mechanisms of little weight. Thus the wings may be set at varying angles in horizontal flight, may be given a high lift setting for quick climb and other angles for landing glides and high speed, and otherwise adjusted at the will of the pilot, and to absolutely known positions of performance.

Further, since pivoted wings in the present airplane may be used to vary the angle of attack of the entire ship, there is no necessity for employing the ordinary elevators at the tail. Consequently great tail weight, with the well-known structural strains and aerodynamic disadvantages, are eliminated, and all surfaces are lifting ones.

In the airplane shown in the drawings, wherein I illustrate as representing present preference a tandem type monoplane having thick hollow wings internally trussed, I am enabled to take full benefit of the advantages of aero-dynamic balance of a tandem-wing equipped ship, advantages, I believe, greater than in any other flight arrangement.

I have further provided practicable controls for maneuvering this type of ship; and I have accomplished this not only by pivoting the wings as described, at the points 35a and 36a, but also by providing adjustable airfoil flaps for both wings, the numerals 40 and 41 designating the right and left flaps for the front wing, and the numerals 42—43 the right and left flaps for the rear wing, respectively.

These airfoil flaps 40—43 are wing-components used either as elevators or ailerons as desired. They form trailing portions for the main fore-wing parts. This construction, with the wings pivoted as a whole, permits a degree of controllability hitherto unapproached. A wing may be moved on its main-body pivot 35a or 36a to change the angle of attack of the entire wing, and simultaneously the ailerons may be variously inclined on the main fore-wing bodies for ordinary aileron action, or elevator action, or both, without upsetting the normal flight balance on the one hand, or the ailerons may be used as controls if desired.

Moreover, as will be seen best from Fig. 3, each wing may be given a straight top, as is preferred, and yet a dihedral bottom so as to taper upwardly toward the opposite wing tips, for lateral stability. Indeed, in a tandem-plane ship as disclosed, a greater bottom dihedral angle than heretofore thought practical may be incorporated on account of the extra controllability to import a high degree of natural lateral stability. This provision is rendered practicable, because of the large degree of manual control afforded when desired, due to the movability of the wings as a whole on their pivots, to vary lift, and the operability of the four large ailerons, also to vary lift and even to make wide differences as to lift between the opposite ends of a wing.

Such aileron adjustments in the present construction, where the main fore-wing parts and the trailing aileron-parts merge into each other in all adjustments, provide in effect a single wing 35—40—41 or 36—42—43 having a variable camber and a variable attack angle.

Thus, due to extra controllabiltiy, and quicker response, the dihedral angle safety factor may be pushed much farther than previously possible, without the difficulty of increasing instability from wind gusts in bumpy weather.

I prefer to space the wings 35 and 36 a considerable distance, as shown. I believe that the vertical spacing or gap between these wings should be as great as practicable and at least one chord length. A considerable fore and aft spacing of the extreme forward and rear wings is particularly favorable for longitudinal stability, and at least two chord lengths are desirable. The airplane then has sustaining airfoils near its opposite ends, and the load is swung midway between the two.

With the wings thus spaced a single or multiple engine equipment and one or more propellers, as indicated in the drawings, may be so mounted that the center of thrust may be placed close to the center of weight, thus allowing a better balancing of the plane about its center than hitherto possible.

This concentration of the load also gives quick maneuverability.

On the other hand, with the forward and rear wings set fore-and-aft at a dihedral angle, neither a stall nor a nose-dive may occur except by the deliberate act of the pilot himself and at the expenditure of considerable effort.

Such setting of the wings should provide, as indicated in Fig. 1 by the center lines 35b and 36b, a higher angle of attack for the forward wing than for the rear wing.

Then, in case of a stall, the front wing eventually loses its lift, causing the airplane to fall by the nose, with the rear wing lifting. This sets up forward speed, so that the front wing has its lift restored and the plane rights itself. In the case of a nose dive, the front wing immediately takes most of the lift, since the rear wing approaches a no-lift angle and loses its lift; and the plane again rights itself. Thus there is incorporated a fore and aft dihedral angle. The magnitude of this angle within limits determines the degree of natural stability.

I prefer to equip the front wing tips, as shown in Figs. 1, 2 and 3, with a comparatively small substantially vertical auxiliary air foil 44. These elements in the flight of the airplane decrease the tip losses by preventing air slipping over the end of the plane to fill the partial vacuum above the plane. These elements also facilitate alighting on the water, acting as small auxiliary pontoons. It will also be noted that they increase the resemblance of the new airplane to the automobile. The air foil 44 may be made wholly or partly dirigible to move with the main rudder. As illustrated, the rear portion 44a is hinged to the front, and is operated by suitable controls (not shown) which may be connected to the main rudder control.

The air foils 44, which may be carried rigidly or detachably, are shown as circular in side elevation. They are desirably constructed of light sheet metal, but hollow and watertight. They may be provided with a hydroplane fin, as shown at 45, for striking and gliding over the water as the ship moves forward in alighting or taking off. These air foils 44 may, if desired, be actually constructed as disk wheels, which may serve not only as out-board safety elements in flight and in alighting on and taking off the water. They may also serve when the airplane is traveling as a land vehicle in alighting, taking off or otherwise, if, for any reason, they should come in contact with the ground.

*Fuselage*

The fuselage comprises a supporting interior framework, as shown more particularly in Fig. 10, to which is attached an exterior covering preferably of corrugated sheet metal. This framework is arranged to transmit and carry the stresses resulting from the various forces acting upon the fuselage from the wings, the power plant and the load. It comprises preferably three longérons 46, 47, 48 at the bottom of the fuselage and running the full length thereof, and two longérons 49—50 at the top of the central or cabin compartment. This framework has at the front at 51 a journal, forming part of front wing pivot 35a, and at the rear is a small journal 52 to form part of pivot 36a, to which the rear air foil may be attached, while at the top at the front end of cabin compartment of the fuselage is a framework platform 53 to which the power plant may be bolted.

A series of uprights 54—55 connects the outer lower longérons 46 and 48 with the upper longérons 49 and 50. One of these uprights 55 is situated directly beneath the power plant, in order to furnish adequate support therefor. A pair of shorter longérons, as at 56—57, extend from the front of the frame to the vertical upright 55, to strengthen the front half of the plane and transmit the forces incident to the front air foil to the body of the frame. A diagonal bracing member extends from the upper rear end of the fuselage of each side downwardly in an inclined direction, as shown at 58—59, while a series of oppositely inclined diagonal braces 60 connect the junctures of the brace 58 and 59 with the base of the adjacent upright. Diagonal cross braces, as for example 61, will be provided for increasing the lateral rigidity.

In the forward part of the fuselage a similar series of diagonal braces is provided on each side of the car, and the corresponding uprights 62 are cross-braced by diagonal cross braces 63. The pivots for the air foils are rigidly connected to this frame. As illustrated, the front pivot 51 comprises a hole made in a plate 64 riveted to the frame, while the pivot 52 is carried by an angle-shaped bracket 65, which is also rigidly connected to the frame. The longérons 46—47 and 48 are held in spaced relation by a plurality of spacing members 66.

The platform frame 53 is preferably open at the center to permit the engine controlling instruments to project into the pilot's compartment.

The body 37 although generally streamlined toward the tail is preferably shaped to resemble the body of an automobile. Thus the body has a forward portion 70 substantially in alignment with the front wing, which portion resembles the hood of an automobile, and lies below the line of vision from the pilot compartment 38, while the pilot compartment itself is provided with front windows 71 overlooking the hood and side windows 72 in resemblance to the construction of a sedan.

I prefer to show the body of a general boat shape and utilize practically the entire length thereof as a hydroplane type for alighting on the water. This arrangement also brings the water surfaces closer to the wings and at the same time closer to the center of weight of the airplane. It also causes the body to resemble a hydroplane type of boat. These characteristics aside from their operative advantages, are also preferred because of their ruggedness and the security suggested to the general public, by reason of the analogy of transportation vehicles of a familiar type unrelated to air craft accidents.

Wing

The two air foils are substantially alike. They are shown in greater detail in my copending application, Serial No. 49,944, filed July 11, 1925. They each comprise in general, a triangular shaped cantilever beam, or truss, as is clearly illustrated in Fig. 6, which extends preferably from one wing tip to the other and continues over the fuselage. In general this truss may be made by uniting two corrugated metal strips, 75—76, by means of an obtuse angle channel 77, the strips being reinforced at the top by braces 78 and 79, the brace 78 of the strip 75 being tied to the brace 79 of the strip 76 by latticed diagonal braces 80, which are riveted to the braces 78—79.

The actual exterior contour of air foil is provided by the envelope 81 which is preferably of metal corrugated circumferentially and shaped to conform to the desired aerodynamic section. This envelope 81 may be attached to the truss by being riveted to attaching angles 78a—79a parallel to and attached to the braces 78 and 79, respectively, at the top. At the bottom the envelope is riveted to attaching angles 82 which are connected to the obtuse channel 77. The corrugations of the strips 75—76 run diagonally upward and outwardly from the base of the wing toward the tip, so that when subjected to the strain incident to the lifting of the fuselage by the wings, the corrugated metal of the sheets 75—76 is under tension in the direction of the corrugations. The member 75 which is toward the incident side of the wing, is braced by certain longitudinal reinforcing plates 83, which not only reinforces the plate 75, but, owing to their attachment as at 84 to the envelope, they maintain the form of the incident edge of the wing. These plates 83, therefore, are in a vertical plane, as shown in Fig. 9. The corrugated sheet 75 is reinforced with angles 83a, which serve also as an attaching means for the plates 83.

The corrugated sheet 76, however, is reinforced with auxiliary angle plates 85, which preferaby extend downwardly and outwardly toward the tip of the wing, thus being under compressive strain.

The wing at suitable intervals along its length is provided with outstanding hubs 86, which may be attached to the framework by being included between rivets 87, which attach the channel 77 to the sheets 75 and 76. These hubs furnish the journals to cooperate with journals 51 and 52 to form the pivots 35a and 36a of the wings, as has been described. As illustrated, for example in Fig. 9, ordinarily two such pivots will be provided for each wing, one to be located on each side of the fuselage.

In the event that it is desired to utilize the articulated wing construction which, as described below, is illustrated in Figs. 23 and 24, it may be desirable greatly to lengthen these hubs 86 in order to increase the relative strength thereof.

The wing carries at its trailing edge a tubular strengthening bar 92, which not only maintains the shape of the edge of the airfoil proper, but also serves as a pivot for the hinge members 93 of the wing tip or ailerons 40—43.

Each aileron in general, as shown in Fig. 6, has the general cross section of an acute angle spherical triangle, which is pivoted along one edge to the bar 92. The upper surface 94 is designed, when in a normal position, to continue the stream line of the upper contour of the airfoil. An over-lapping plate 95 is pivoted to the airfoil, with a spring pivot 96, and is of such shape and size and so positioned that it can bridge over between the wing and the lower edge of the aileron to continue the stream line contour of the lower face of the airfoil on the aileron, while permitting motion of the aileron on the airfoil by the sliding contact of the plate 95 with the aileron.

The power plant comprises preferably an air-cooled internal combustion engine, and a propeller, as well as all of the operative connections excepting the fuel line. It is preferably arranged as a separable self-contained unit which may be separately assembled and placed upon the plane in its completed form, and which may be readily removed as a unit and replaced by another of like construction. The power plant is preferably arranged above the level of the front plane and in advance of the center of gravity of the entire airplane. This power plant unit is indicated by the numeral 97 on the drawings situated directly above and in advance of the pilot station, so that when the unit is in place the engine controls will depend within easy reach of the pilot, as indicated at 98 in Fig. 1. The power plant 97 may either be made of separate stream-line construction, as shown, or of a construction to merge into the stream-line of the body of the fuselage.

With the power plant located as described it is at about the point in the length of the airplane immediately in advance of the center of gravity. This also corresponds to the position of the motor of an automobile.

With this arrangement, it is most convenient to arrange the propeller axis as indicated at 99 in Fig. 1. This axis is downwardly inclined preferably so as to be at an angle to the line 36b of rear wing 36. With the propeller having the slip-stream neutral over the rear wing, important advantages accrue. In straightaway flight, the propeller stream is delivered at a neutral angle relative to the chord of the rear wing. Thus the propeller slip-stream does not effect the lift on the horizontal tail surfaces or can even be arranged at such an angle as to leave the plane nose heavy when the engine stops.

At the same time, due in part to the shapings of the wings themselves, assurance is provided that the slip-stream from the front wing will not interfere with the rear wing.

The gear for landing and taking off includes mainly a pair of wheels 100, one at each side of the car, well forward of the center of weight and a wheel 101 at the rear.

The rear wheel 101 is journalled in a bracket 102 which, in turn, is journalled to the stern post of the fuselage coaxial with the rudder as shown at 103. The bracket is preferably composed of articulated links, while a spring cushioning member 104 is the more vertical link absorbs shocks. It will be noted that the rudder is cut out to allow for the wheel 101 and its bracket. The rudder and bracket are intended to turn together to be operated by the same steering wheel. A suitable form of control comprises arms 104a and 104b attached to the rudder and bracket, respectively, each, connected to arms 105a and 105b, respectively, on a stub post 105. The connections between the rudder arm 104a and the arm 105a may be by cables, while the connections between the stern wheel arm 104b and the arm 105b have interposed therein spring elements 105c to prevent damage to the wheel damaging the rudder control. The position of the post 105 is controlled by the main steering wheel to which it is connected in any suitable manner, as by cables. The lateral wheels 100 are preferably arranged so that they may be retracted toward the body, as shown in Fig. 3. This may be accomplished by mounting them upon journals 106 carried by arms 107 pivoted as at 108 to brackets attached to the fuselage body. Links 109 connect at one end to sleeves 110 carried by the arms 107 and at the other end are controlled by a slotted bracket 111. Links 112 connect the link 109 with cranks 113 operated by a suitable train of mechanism from a handle 114 within the pilot compartment such that, as the handle is rotated, the cranks 113 pull up the links 112 and thereby raise the wheels through the medium of the links 109.

In Figs. 4 and 5 are illustrated a modification in which brakes are applied to the wheels. In order to accomplish this result a modification of the wheel supporting mechanism to accommodate the brakes is provided.

In this modification the wheels 100a may be fixed upon their shafts 115, which rotate in suitable housings 116 in the sides of the cock-pit. Interposed in the shaft 115, between the cock-pit and each of the wheels, is a gear train comprising two bevelled gears 117 and and 118 and a meshing idler gear 119. This construction provides a pivot, around which the wheel 100a may rotate.

The lower end of the link 121 is attached to a sleeve 122, so that as the link 121 is raised and lowered, the wheels may be raised and lowered about the axis of the gear 119. It will be clear from this construction that while the car is running upon the ground, the rotation of the wheels 100a will drive that portion of the shaft 115, which is within the cock-pit, through the medium of the bevelled gears. Within the cock-pit there is provided a brake drum 123 surrounded by a brake-band 124 under control of brake lever 125. With this construction when the brake lever 125 is operated, friction is imposed upon the shaft 115, which is transmitted to the wheels by the bevelled gears.

*Aileron control mechanism*

In the machine as above illustrated, four flaps are provided, one on each side of each wing, and the joy stick is preferably arranged so that its forward movement will raise both front flaps and depress both rear flaps but so that a movement of the joy stick to the side will raise the flaps on the side toward which it is moved. A convenient means of accomplishing this result is shown in Fig. 14.

The numeral 200 designates a joy stick which is pivoted for forward and back movement as well as for movement from left to right. Thus we may provide upon the fuselage body journals 201 in which are carried the pivots of a bracket 202, having an upstanding arm 203. The pivots are so arranged that the arm 203 may move freely backward and forward within the fuselage but not laterally. The bracket 202 carries also a journal 204 which is at right angles to the journals 201 and on this journal is mounted the joy stick.

With the foregoing construction it will be evident that the joy stick may be moved from left to right about the pivot 204, the bracket 203 remaining stationary, or it may be moved forward and back about the pivots 201 carrying the upstanding arm 203 with it. A T-shaped crank 205 is pivoted as shown at 206, having the two lateral arms 207 and 208 extending to the side, while the stem 209 extends toward the joy stick and is forked as shown at 210 to embrace it. The pivot 206 is equally spaced between the arms 207 and 208.

A mechanism train is arranged whereby a forward and aft movement of the arm 207 will control the ailerons 35L and 36R while the corresponding movement of the arm 208 will operate the ailerons 35R and 36L. Each of these mechanisms provides that a forward movement of the arm will raise the front aileron and lower the rear. In this form of the invention the connections are by means of thrust tubing and connecting levers, but in any event it is desirable that the application of a force to the aileron shall act through the pivot 35' or 36' of the wing so that the tilting of the wing by the mechanism to be later described, will not affect the relative position of the wing and aileron.

A convenient method of doing this consists in the including in the operating train a link so mounted that the movement of one of its arms includes in its path the axis 35' or 36'. For example, the mechanism for controlling the wing 35 is as follows. There is connected to each of the ailerons 35R and 35L a rigid lever 215 which is connected by a link 216 with a lever 217, which is pivoted as at 218 directly below the pivot 35', a distance equal to the link of the lever, so that as the lever 217 swings about its pivot, the pivotal connection 219 between this lever and the link 216 will move in an arc, including the center of the pivot 35'. This lever 217 is operated by a link 219a, in turn controlled by a series of links and levers 220, 221, 222 and 223, the latter being connected directly to the arm 208.

The object of this train of mechanism is to transfer the motion from the arm 208 to the link 217, and the number of links and levers has been taken to afford convenient locations upon the framework of the fuselage for the pivots for the levers.

For many purposes it is desirable to arrange it so that the general effective camber of the front and rear airfoils may be altered similarly and simultaneously to obtain the most desirable wing construction for the particular conditions existing during any portion of the flight. This may be conveniently accomplished in accordance with this invention by altering the neutral position of all of the ailerons relative to their respective airfoils simultaneously and similarly. This may be conveniently accomplished by the construction illustrated in Fig. 15.

In Fig. 15 the ailerons and the primary control levers are designated by the same numerals as in the preceding form. This modification also illustrates a method by which the ailerons may be controlled by flexible cables. In this figure the aileron control operating train may contain a lever 230 having oppositely disposed arms 231 and 232 to each of which a flexible cable is attached as 233 and 234, the cable 233 being attached to the arm 231 and the cable 234 being attached to the arm 232 and the joy stick is designed to move these cables equal amounts in opposite directions. As illustrated, the joy stick is shown at 235 pivoted by a ball and socket joint intermediate its length as shown at 236.

One of the cables 234 is connected to the joy stick above the ball and socket joint, while the other one 233 is connected in equal distance below it so that if the joy stick is moved about the ball and socket joint the required movement of the cables is effected. In order to effect the control of the ailerons by tilting of the joy stick in the manner described, the ailerons will be so connected up that no movement of the joy stick can be used to simultaneously depress or raise all of the ailerons. To effect this movement, individual mechanism is provided for simultaneously taking up on all of the upper cables 234 an amount which is simultaneously fed out to the lower cables 233.

A convenient method of accomplishing this is to mount within the joy stick two nuts 240 and 241 which are controlled by a screw 242 for movement longitudinally of the stick. The cables 233 and 234 are carried over pulleys 243 and 244 respectively, and from thence the cables 233 are attached to the nut 240 and the cables 234, to the nut 241, as, for example, by means of outstanding brackets 245. It is possible to connect the cables 233 and 234 to the same nut from opposite sides, but I have preferred to illustrate the use of two nuts as it simplifies the drawings and to some extent simplifies the construction by avoiding interference between the cables and the ball and socket joint. I have, therefore, arranged the nuts one with a right hand thread and one with a left hand thread, so that the rotation of the screw 242 will cause the nuts to approach or recede from each other. The upper portion of the joy stick, as shown at 246, comprises a rotatable handle to which the screw 242 is rigidly attached. By this construction the movement of the joy stick forward or to the side will move the ailerons in the manner previously described, but the simultaneous raising or lowering all of the ailerons may be effected by rotation of the handle.

The desired form of movement of the ailerons is shown diagrammatically in Fig. 16, in accordance with which, for example, the movement of the joy stick to the right (to the top of the figure) as indicated by the solid line arrow will give a thrust to the rod connected to the ailerons 35R and 36R, and will pull in on the ailerons 35L and 36L, thus raising the former and dropping the latter. Similarly, a movement of the joy stick forward as shown by the dotted line arrow will give a thrust to the operating mechanism of both ailerons 35L and 35R, thus raising them and will draw in on both ailerons 36L and 36R, depressing both of them. A movement of the joy stick (downwardly of the figure) as shown by the dot and dash arrow, produces the effect precisely contrary to the movement to the right as previously described.

In Fig. 17 is shown the climb stick for controlling the angle of attack of the two wings simultaneously. As illustrated, a bell crank 250 is pivoted to the frame at 251, one arm being connected to the reinforcing rod 92 of the wing structure by a link 252 and the other being connected directly to the climb stick 253 by a link 254—255. The climb stick is pivoted to the frame as shown at 255a, and carries at its upper end a spring operated detent 256 cooperating with a notched arc 257. Connection between the climb stick is such that if the climb stick is rotated relative to the arc, both wings are simultaneously raised or lowered.

Reference has been previously made to the front and rear wings normally presenting different angles of attack whereby a fore and aft dihedral angle conducive to stability is afforded. In many instances it is desirable to change the amount of this dihedral angle in order to change the inherent stability of the plane, in accordance, for example, with the weather conditions. There has, accordingly, been incorporated in this construction means for changing this dihedral angle. To this end there is shown at 258 in the link 255 of the front plane, a sleeve into which is threaded a screw 259 controlled by a crank 260, so that by rotation of the crank the effective length of the link 255 is altered, thus tilting the front plane without altering the rear, and hence changing the effective fore and aft dihedral angle.

In Figs. 22, 23 and 24, there is illustrated a modification of the invention in which the tilting of the planes themselves is utilized for control without the necessity of the employment of auxiliary ailerons. To this end the right and left halves of each wing are rotatably articulated to each other while maintaining their longitudinal and fore and aft structural stability. This may be accomplished by pivoting the right and left halves of the wing in the manner previously described, but independently of each other as shown at 280 and 281. The relative rigidity of the wings is maintained by struts 282 and 283 which connect the upper portions of the triangular trusses. These structures, however, are connected to the trusses by ball and socket joints as shown at 284, whereby either wing may be rotated through a limited arc independently of the other. It will be observed that in this construction there is theoretically a movement of the tops of the wing toward each other upon the rotation, because of the angularity of the rods 282 and 283. It will be found, however, that with the maximum amount of relative rotation which is practically required, that the effect of the angularity of the structures is unappreciable.

Suitable mechanism will be provided for relatively tilting the wings and for this purpose a mechanism similar to that shown for controlling the ailerons in the previously described form of invention may be used. Such a mechanism will be obvious and need not be here further described. The joy stick is preferably arranged, however, to tilt both wings simultaneously in the same direction upon moving the joy stick fore and aft, but to tilt two halves of the wing oppositely when the joy stick is moved to the side. Mechanism may be also provided for tilting the front wing relative to the back to affect the dihedral angle. Such lever mechanism, however, will be obvious without further illustration.

In Fig. 24 there has been substituted for the struts 282 and 283 arcuate angles 290 and 291, one of which carries an arcuate channel 292 to furnish a guideway in which the upstanding arm 293 of the angle 291 may move.

This form of construction furnishes relative support for the two halves of the wing without the angularity previously referred to. In Figs. 18, 19, 20 and 21 are illustrated modified forms of the invention. In Figs. 18 and 19, a power plant comprises a central motor 300 at each side of which are disposed propellers 301 which may be operated by gear and worm drive 302. This modification illustrates the simplicity with which the wing propeller power plant may be replaced if desired by a two propeller power plant and under proper conditions this substitution may be made without otherwise altering the plane. In the modifications of Figs. 20 and 21 the invention is applied to a military plane. In this form there are mounted upon the plane a plurality of machine guns 310 and 311. In order to afford greater freedom of vision to the pilot and greater ease of manipulation of the machine gun, the power plant in this form of the invention may be made in the form of a two propeller power plant similar to that just described, save that it may be situated below the line of vision of the pilot.

The operation of the new type of airplane disclosed shows a great number of advantages, additional to those already pointed out.

In the first place, the bottom of the body 37 is long and forms in itself a perfect skid for emergency landings on either rough ground or ice, where wheels are of no use. In the present case the wheels would rebound, and the bottom act as a skid to prevent nosing over or accidental spill. Even in the small plane illustrated, the body is long enough to straddle even a drainage ditch at the side of the road, or any normal depression. More than that, all of the structure in front of the pilot is full protection for him at the low speeds at which he would land even though he ran directly into a wall. In other words, the new airplane has automatic front and rear "bumpers", the front wing 35 and its tips, particularly with the elements 44 present, affording added protection should the airplane strike to one side.

The long body also, with its long hydroplane-boat-bottom, and with the center of weight close down to these hydroplane surfaces, makes water alighting safe under practically all conditions; especially with the elements 44 and 45 present.

It is in connection with alighting on land, however, that present airplanes offer most difficulties.

In the usual landing, the ship is brought in fairly fast, over the tops of the trees, and with its nose down toward the ground. Ideally, it is leveled out about a foot above. Then comes what is known as the "float"; and the pilot holds the ship at that height while it is slowing down to a speed of "no-lift." After the ship floats for 100 feet or more, it suddenly gets to its stalling speed, and it is at that instant that the ship will settle lightly and safely on the ground in a three-point landing, to use up the remainder of its momentum on the "roll". During the start of this roll period, there is very little load on the wheels, since the wings are still carrying considerable weight. The usual skid at the rear of the machine comes into action as a brake only when considerable ground speed has been lost. Two-thirds of the landing space of present day ships is taken up with the "float" and the "roll" on the ground. Flying boats, traveling at even higher speeds, land passengers safely in about one-fourth the space required for ground landing speeds.

In my present airplane, on the other hand, there are accomplished on land the alighting advantages of flying boats. (The wing and aileron controls described permit the float period to be quickly and safely initiated and ended.) Immediately the wheels 100 and 101 approach the ground on the "float", the wings are thrown to the position of no lift, and the ship is set down on the ground full weight. The float is shortened by this plan, as well as the roll, by application of the brakes to the wheels 100. The rear wheel 101 and said wheels 100 provide the three-point land contact which the new ship gently takes up at the start of the roll. Although this roll is shorter than heretofore, as explained, the shock-absorber equipped rear wheel is nevertheless steerable from the rudder-bar. The steering of the ship is easy, and without any tendency to nose over, even if ground unevenesses are not missed, due to the fact that most of the weight is carried on the two wheels 100 forward, and the rest on the dirigible wheel 101 at the rear.

Thus landing fields shorter than 100 feet will probably be found safe under all weather conditions, and on all reasonable terrain. A forced landing in small fields and back lots becomes possible, and in safety; as compared with the large space required now to make even a fairly safe forced landing.

Assume the airplane nearing the end of its run, and the desired landing space near enough for the glide to be commenced; the wings are moved on their main body pivots 35a and 36a to set up a good fast glide, and the engine cut completely. Only the ailerons then need be used to keep the plane stable while it takes its own normal glide with these ailerons and the rudder used for steering.

As the ship passes over the trees usually bordering the field, or at about that height as it reaches a field edge, it arrives at a comfortable gliding speed, and the pilot levels out as usual. The minute he is ready he can make the wheels touch the ground without shock, at which instant, as above explained, he moves the wings to destroy all lift or even to give them a negative lift, to set the machine full weight on the ground, brakes on, and hasten the end of the roll.

Some of the advantages of a low landing gear such as herein shown have been mentioned. In previous airplanes it has been necessary, in order to change the angle of climb of the entire airplane, to change the angle of attack of the main wings. Therefore, in order to get a steep angle of attack for landing it was necessary to fit the airplane with a high landing gear of great resistance, so that enough angle of attack could be reached to enable the airplane to settle down at the angle of its wings' maximum lift. In my present type of plane, however, the wings can be rocked on their main pivots to the proper maximum lift angles, and then the airplane settles itself down at its normal gliding speed on a level keel, rather than with its nose sticking up in the air, obstructing the pilot's vision.

Another advantage occurs to the tandem arrangement with the front wing low, on account of the ground effect experienced when approaching the earth. As a wing in flight approaches the ground, the drawback from the wings hitting on the earth and rebounding, gives a considerable increase in lift. Thus, at such a period, a wing can be used at steeper angles of attack without burbling than is possible when in free air. When approaching the ground for the landing, as previously explained, the front wing being closer is influenced more by this ground effect than the rear wing, so that if a pilot inadvertently comes too close to the ground in a dive to earth, there is the tendency of the ship to right itself parallel with the earth through this ground effect, thus tending to prevent a landing which otherwise might be disastrous. This effect is of importance in landings both on land and on water. This effect occurring on the water also makes it easier to get the boat up "on the step" for a take-off in a way that is a real problem on smooth water with the usual hydroplane arrangement.

The take-off of the new airplane is extremely simple and very quick.

The ordinary plane is required first to accelerate to enough speed to lift the tail off the ground and get the main wings into a horizontal non-lifting position with the wings resisting. This often takes one hundred feet; and the greatest problem is to get the ship up to take-off speed against the tremendous drag of wings and tail. In my present airplane, the wings are rocked to neutral lift, so the only resistance to be overcome by the power is the acceleration of the mass. The acceleration is merely that of a 900 pound automobile with a 60-horse power engine.

Once this acceleration is had, and the plane is traveling sufficiently beyond its flying speed, the wings are rocked back, gradually or instantly, depending upon the acceleration already had, to the angle of climb desired. If the proper terminal notch of those on the quadrant 257 of Fig. 17 be equipped with a high catch, such notch representing the maximum angle of climb with the engine wide open, the pilot may be given an absolute gauge of what is safe climb and what is not.

In an emergency, he can use the impact of a quick change of wing angle to jump obstructions in taking-off, and thus accomplish things impossible with previous airplanes.

The take-off of the present ship is thus far less in comparison with the horse-power per pound than any other previous type.

Once in the air, the climb-stick may have its trigger 256 (Fig. 17) set in a designated notch; which, with full throttle, will give horizontal flight without climb—the "maximum speed" position of the stick. The positions in between will be angles at which the plane will fly horizontally at throttled engine positions, so that one notch particularly may be marked "cruising speed".

In the air, further, as already explained, there is automatic transverse and fore and aft stability, and hence the assurance that a stall is impossible, as also a nose-dive, or a side-slip; that banking is semi-automatic. Nevertheless, also as explained, lateral and longitudinal balancing, and change of elevation, may all be quickly and simply accomplished, and without real effort, solely by aileron action from a single joy-stick wheel or the like.

Referring to Figs. 20 and 21, it is pointed out that the new airplane may be revised for war work, to provide almost a new type of aerial arm. Machine guns forward become possible, without the use of synchronizers or hollow crank shafts; while the vision of the pilot would be unimpeded, as it would not be in the case of previous combat planes. Also, the new combat plane would represent less of a target for anti-aircraft guns on land or on any machine attempting to start attack at some distance, because instead of a single large wing offering a large and comparatively easy target, the wing surfaces would constitute a plurality of small targets considerably spaced one from another.

In the new military design, fitted with propellers at the sides between the tandem wings, and with the pilot at the rear, a readily replaceable machine gun, and one swingable in azimuth as well as pointable up or down, becomes feasible at the front. Further, due to the location of the center of weight, this front gun can be of a larger caliber than that at any other point on the structure. This front gun, too, would have the most extreme firing range possible of any position in any airplane, with no blind spots except from below. The lower gunner to the rear, and just forward of the pilot, could cover any blind spots for the upper forward gunner. Especially in a slightly larger form, the new airplane could be provided as an extremely protected type of bomber; and with opportunity of carrying the loads directly at the center of pressure while having all points protected by armored equipment and massed at the one point to give maximum maneuverability.

The upper gunner can sweep through the entire azimuth, to fire at all elevation angles above both wings, while the lower gunner can sweep through practically a half circle, and at all angles of declination below the wings on both sides of the plane, or the side of the plane through which his gun is at that instant protruded, if he has but a single gun. In the former case, his field of fire would be equal in azimuth practically to that of the upper gunner. The new battle airplane would, of course, be capable of performing all the known tactical maneuvers, such as the Immellman turn, the loop-the-loop, and the others developed in the late war, and with greater ease and certainty and niceness of control than in previous types of planes. In addition, the new plane can drop like a plummet vertically, and still be in a horizontal position, with all guns always under control and in firing position, no matter what the rate or angle of descent; as well as execute other maneuvers which can never be possible with the rigid-wing location of present day planes.

The advantage of the new airplane for navy work off ships is obvious. It is particularly adapted for use on plane-carriers where catapults and deck take-offs are a necessity.

I have taken particular pains to show and describe in detail a small two or three passenger type of embodiment of the invention, and one especially adapted for extremely short landing and take-off distances. The present invention, of course, may be variously embodied, for war or commerce purposes. For instance, giant structures are possible; of many horse-power, capable of carrying passengers and all load within the forward and aft wings and having corridors in connecting fuselages of any size which commerce may in the future require; while the wing equipment may include combinations of more than two wings fore and aft, as various polyplane arrangements fore and aft.

Further, the tandem-related wings or wing-groups may have a wing or a wing-group intermediate them. For example, the airplane of Fig. 1 could be kept as shown and described except for an intermediate wing similar to the wings 35 and 36, and similarly mounted, equipped and controlled, although possible with the ailerons and other controls omitted. The third wing could be used mainly for straight-away flight; with the wings 35 and 36, or all three wings, be used as already described, for taking off, climbing, gliding and landing. The third wing preferably would be similar to the other wings in aspect ratio and the like, and desirably would be located over the center of gravity of the ship; the idea being to obtain a small wing area for the ship to increase the speed range. Then, for instance, after climbing to the desired altitude, the fore and aft wings could be thrown into positions of minimum drag and the plane proceed supported by the middle wing at the high speed allowed by the small wing area.

Further: It has been pointed out how the new aileron and aileron controls permit the elimination of the usual elevator and horizontal tail surfaces, so that only the rudder is retained, as indicated at 67, in the type of ship illustrated in the drawings. However, even this last could be eliminated, if the rear wing were mounted also on a vertical axis and arranged to be rotated on such axis through slight angles from a suitable control, as the usual rudder bar, or rudders could be fitted to the wing tip discs.

Thus, while one form of the invention, although variously modified, has been shown and described in detail, it should again be emphasized that the drawings and the foregoing description merely indicate a typical embodiment of the invention which may take many different forms, and which, as pointed out, may particularly assume the form of a giant air liner of enormous horse-power and capable of carrying at once a large number of passengers, an ample crew, a considerable freight cargo, and fuel for long flights.

As to the terms used herein, and in the appended claims, it is thought that the intended meaning is in all cases clear. The gap between the fore and aft wings, and the placing of these wings at different levels, substantially as shown, is only a preference. It should be explained, however, that, as the invention is now understood, these two features act together to give a composite net result which may be obtained in other ways than as shown. To explain further, the object of different levels for the two wings, as the invention is now understood, is to insure that the downdraft of the air-stream from the front wing will clear the rear wing or interfere as little as possible therewith. The manifold advantages accruing purely from a suitable wing gap, especially where thick wings are used, have already been explained. Yet, in connection with such a gap, different levels also for the two wings are now preferred, despite the fact that theoretically the slip-stream advantage of such different levels could be gained, instead, by a wider gap between the wings. Yet too wide a gap would run into more weight, less controlability, more cost, loss of maneuverability, and less safety in crashes.

As to the transverse wing section preferred, which I have herein indicated by referring to a preference for thick or fat wings, I means by these terms "thick" and "fat", respectively, wings having fineness ratios substantially as explained in my co-pending application Serial No. 42,944, filed July 11, 1925.

When in any of the subjoined claims I refer to a wing, and not merely to an airfoil, an air-attacking surface or the like, I mean a real wing; something having an aspect of more than 1. Any so-called wing that has an aspect ratio materially less than 1, is not a true wing; and therefore it would be incorrect to say that such an air-attacking structure has an aspect ratio, in other words, which has an average chord materially greater than its span is not a wing as aero-dynamics are now known to me; for only its front edge can lift, although such a structure may properly be termed a fin.

The plane illustrated is intended for use upon the water, and the normal water level is diagrammatically indicated in the drawings and designated W.

It will be obvious that many apparently widely different embodiments of the invention can be made without departing from the scope thereof, and that I intend that all matter contained in the above description or shown in said drawings shall be interpreted as illustrative and not in a limiting sense.

It is to be understood, further, that the language used in said claims is intended to cover all the generic and specific features of the invention herein described. Said claims are also intended to represent statements of the scope of the invention subject to full allowance of the due and proper range of equivalents. These claims are thus to be construed as extending to all such forms or modifications of the invention as fall within a broad interpretation of the terms used in the claims.

I claim:

1. An airplane having, in combination with a pair of wings one totally ahead of the other, a spacing and mounting structure for said wings including a main rearward cockpit portion tapering in height and depth toward the tail of the airplane, and a propeller located at a point ahead of the forward end of said portion but in rear of and above the forward wing, said structure also including a portion forming a forwardly extending stepped-down prolongation of the first mentioned portion, the forward wing being carried near the forward end of said forwardly extending portion.

2. In an airplane, the combination of a generally central fore and aft body, said body intermediate its ends being abruptly upwardly enlarged to provide a secondary nose, a forward wing ahead of said nose, a rear wing aft of said nose, a propeller intermediate said wings, and a power plant for the propeller carried by said body nearer said nose than either of said wings.

3. An airplane including in combination a fuselage, a wing secured thereto, a rudder movably secured to said fuselage, air foils attached to the wing adjacent the outer end thereof, said air foils extending vertically with respect to the wing and including trailing portions movable with respect to their forward portions and said trailing portions being adapted to move simultaneously with said rudder.

In testimony whereof I affix my signature.

WILLIAM B. STOUT.